(12) United States Patent
Kuehnle et al.

(10) Patent No.: US 9,188,171 B2
(45) Date of Patent: Nov. 17, 2015

(54) AXIAL ACTUATING DEVICE

(71) Applicant: Schaeffler Technologies AG & Co. KG, Herzogenaurach (DE)

(72) Inventors: Michael Kuehnle, Buehl (DE); David Schnaedelbach, Baden-Baden-Neuweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 413 days.

(21) Appl. No.: 13/690,437

(22) Filed: Nov. 30, 2012

(65) Prior Publication Data
US 2013/0146828 A1  Jun. 13, 2013

(30) Foreign Application Priority Data
Dec. 7, 2011  (DE) .......................... 10 2011 087 873

(51) Int. Cl.
*F16H 25/06* (2006.01)
*F16D 25/0635* (2006.01)

(52) U.S. Cl.
CPC ................................ *F16D 25/0635* (2013.01)

(58) Field of Classification Search
USPC ............................................ 192/85.27, 85.32
See application file for complete search history.

(56) References Cited

U.S. PATENT DOCUMENTS 3,650,364 A * 3/1972 Laing ......................... 192/85.32

FOREIGN PATENT DOCUMENTS

GB          895061       * 4/1962

* cited by examiner

*Primary Examiner* — Richard Lorence
(74) *Attorney, Agent, or Firm* — Simpson & Simpson, PLLC

(57) ABSTRACT

An actuating device for exerting a force that causes two components arranged to be rotatable relative to each other about an axis of rotation to be urged axially away from each other comprising a radial support element forming a first hydraulic pressure chamber and a second hydraulic pressure chamber, each of the pressure chambers surrounding the axis of rotation and the first pressure chamber being in fluid connection with the second pressure chamber. The actuating device further comprises a first piston axially supported on the first component for sealing the first pressure chamber in an axially displaceable way and a second piston axially supported on the second component for sealing the second pressure chamber in an axially displaceable way.

11 Claims, 1 Drawing Sheet

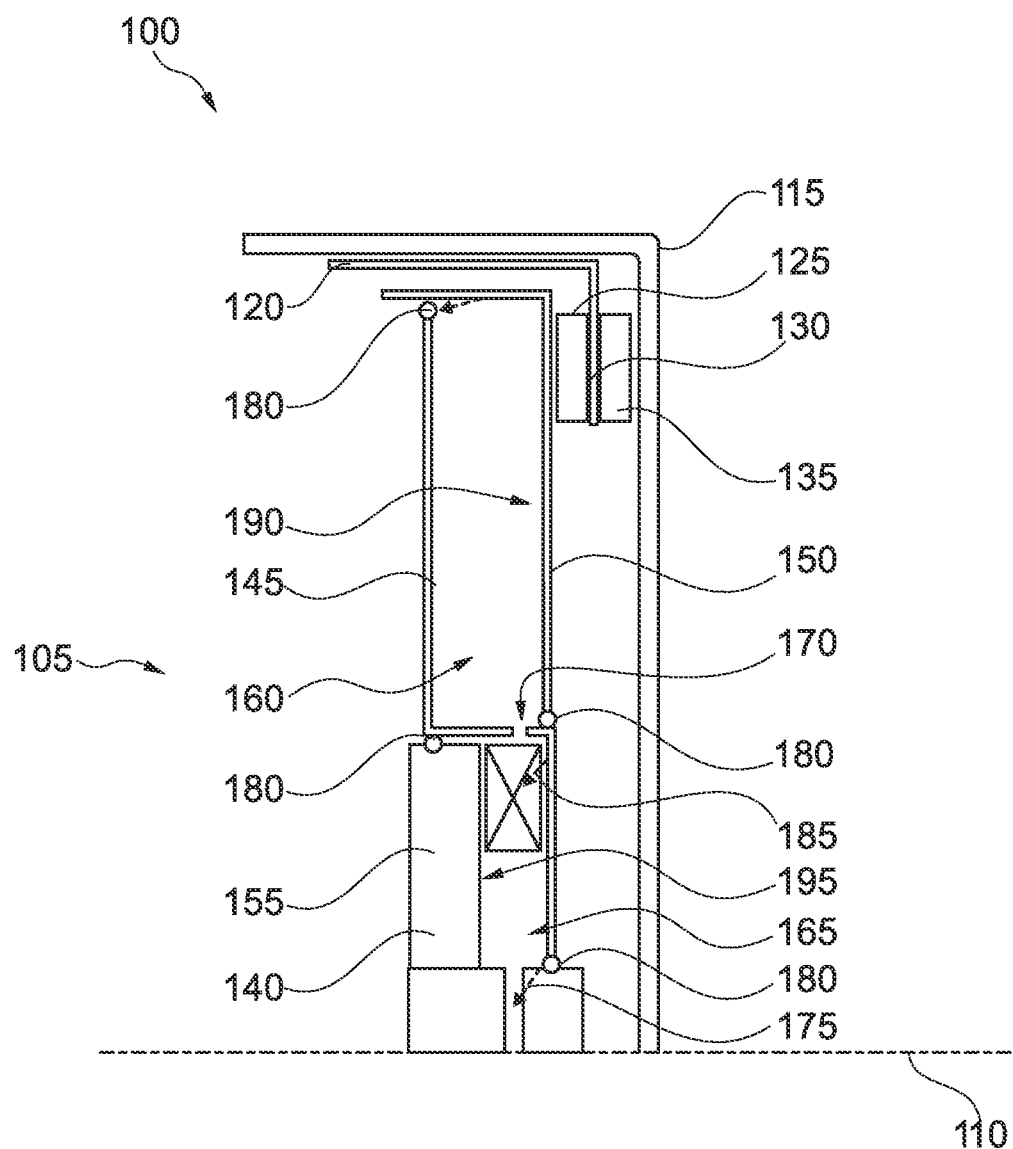

AXIAL ACTUATING DEVICE

CROSS-REFERENCE TO RELATED APPLICATIONS

This patent claims priority of German Patent Application No. 10 2011 087 873.4 filed Dec. 7, 2011, which application is hereby incorporated by reference.

FIELD OF THE INVENTION

The invention relates to an axial actuating device. More particularly, the invention relates to an axial actuating device for a friction disc clutch.

BACKGROUND OF THE INVENTION

In a drive train of a motor vehicle, a friction disc clutch is used between a drive motor and a transmission. The friction disc clutch in general comprises at least one friction disc and a pressure plate. The friction disc and the pressure plate are both arranged to rotate about a common axis of rotation. The friction disc is connected to the drive motor in a force-locking way and the pressure plate is connected to the transmission in a force-locking way. A reverse arrangement is likewise possible. When an axial force is applied to press the friction disc axially against the pressure plate, a transmission of power is established between the drive motor and the transmission due to a friction-fitting connection by the clutch.

BRIEF SUMMARY OF THE INVENTION

An actuating device that generates the axial force is supported both on the friction disc and on the plate. When the friction disc and the pressure plate are axially separated from each other, they rotate at different rotational speeds. As a consequence, the actuating device needs to be capable of maintaining the axial force even while the pressure plate rotates relative to the friction disc. The pressure chamber is supported on the friction disc by an axial bearing, which is usually a rolling bearing. In general, the actuating device is a hydraulic actuating device including a pressure chamber and a piston that seals the pressure chamber in an axially displaceable way. The piston is axially supported on the pressure plate and the pressure chamber is axially supported on the friction disc.

During operation of the clutch, the rolling bearing may be subject to great loads. Therefore, it is of relatively large dimension.

In accordance with the invention, an actuating device for exerting a force that causes two components that are arranged to be rotatable relative to each other about an axis of rotation to be urged axially away from each other comprises a radial support element forming a first hydraulic pressure chamber and a second hydraulic pressure chamber, each pressure chamber surrounding the axis of rotation and the first pressure chamber being in fluid connection with the second pressure chamber. The actuating device further comprises a first piston axially supported on the first component for sealing the first pressure chamber in an axially displaceable way, and a second piston axially supported on the second component for sealing the second pressure chamber in an axially displaceable way.

Thus, it is possible in part or in total to deflect a portion of a supporting force that acts between the second component and the support element via the second piston. Consequently, the mechanical effort for an axial bearing that supports the support element relative to the second component may be of smaller dimensions. This may contribute to reducing manufacturing costs. In addition, the actuating device may be of more compact design, potentially reducing the installation space on the friction disc clutch. This offers greater freedom in terms of the design and construction of the actuating device.

The pressure chambers may be arranged to be radially offset against each other. Thus, the support element may be of simpler shape and may contribute even further to reducing the manufacturing costs of the actuating device.

In particular, the second pressure chamber may be located radially inward relative to the first pressure chamber. The first pressure chamber may thus be part of a known actuating device and the second pressure chamber may be provided at a location where additional installation space for the second pressure chamber may be provided in a constructionally simple way.

A hydraulically effective surface of the second piston may be smaller than a hydraulically effective surface of the first piston. Since the two pressure chambers are in fluid connection with each other, there will always be an identical pressure in the two pressure chambers. The ratio of the forces acting on the two pistons can easily be adjusted in a constructional way by means of the ratio between the hydraulically effective surfaces of the two pistons. If the surface of the second piston is smaller than the surface of the first piston, the force acting between the support element and the second component is reduced but remains greater than zero. Thereby the axial position of the support element may be defined in an improved way.

The invention is based on the object of providing an actuating device that provides improved support of the occurring axial forces in order to be able to use a rolling bearing of smaller dimensions. In accordance with a preferred embodiment, a bearing for axially supporting the support element is provided on the second component. The bearing may in particular be received in the second pressure chamber. This allows a more compact arrangement of the second pressure chamber and of the bearing, while at the same time the bearing is surrounded by the fluid present in the second pressure chamber, which may contribute to cooling and lubricating the bearing.

In accordance with one embodiment, the bearing comprises a rolling bearing. The rolling bearing may be of relatively light dimensions and may contribute to reducing a rotational resistance between the second component and the support element.

In accordance with another embodiment, the bearing comprises a journal bearing. The journal bearing may in particular comprise a contact plate. Using a journal bearing instead of a rolling bearing may reduce the manufacturing costs of the actuating device.

In accordance with yet a further embodiment, the second piston is rigidly fixed to the support element in a radially to the inside or radially to the outside. The axial movability of the second piston relative to the support element is implemented by an axial deformability of the support element. This allows a reduction of the number of seals, which may increase the reliability and useful life of the actuating device. Moreover, the rigid attachment may be advantageous in terms of the assembly of the components.

In accordance with yet another embodiment, the second piston is embodied to be integrated with the second component. Such an arrangement may contribute to even further reducing the costs of the actuating device.

The invention will be described in more detail with reference to the appended FIGURE.

BRIEF DESCRIPTION OF THE DRAWINGS

The FIGURE shows a diagrammatic representation illustrating the upper half of a longitudinal section along an axis of rotation of a friction disc clutch including an axial actuating device.

DETAILED DESCRIPTION OF THE INVENTION

Friction disc clutch 100 is provided to selectively establish a nonpositive connection between component 115 and pressure plate support 120, which are arranged to rotate about axis of rotation 110. Component 115 may, in particular, comprise a cover or housing of friction disc clutch 100 shown in the FIGURE. To establish the nonpositive connection, friction facing 125, pressure plate 130, and friction facing 135 are arranged axially adjacent to each other at a radial distance to axis of rotation 110. Friction facings 125 and 135 are arranged in a torque-locking manner but are axially displaceable relative to component 115. Pressure plate 130 is located axially between friction facings 125 and 135 and is fixed to pressure plate support 120 in a torque-locking but axially displaceable way.

The illustrated design of friction disc clutch 100 in terms of component 115, friction facings 125, 135, and pressure plate 130 is only described by way of example. Other embodiments may include more or fewer friction facings 125, 135 and/or a larger number of pressure plates 130. In some embodiments, friction facings 125, 135 and/or pressure plate 130 are axially immovable relative to component 115, 120 to which they are connected in a torque-locking way.

Friction disc clutch 100 establishes a transmission of power between component 115 and pressure plate support 120 when friction facing 125 is pressed axially to the right against pressure plate 130, which is pressed against friction facing 135, which, in turn, is pressed against component 115. Conversely, the transmission of power between component 115 and pressure plate support 120 may be disrupted by removing the axial force that acts on friction facing 125.

In a non-illustrated further embodiment friction facings 125, 135 and pressure plate 130 are axially pressed together by a spring and when actuated, actuating device 105 removes the axial compression, i.e., it compensates the axial force of the spring to reduce the axial compressing force on friction facings 125, 135 and pressure plate 130 and to open clutch 100.

Actuating device 105 is provided to press friction facing 125 axially to the right towards component 115. Actuating device 105 is supported on component 140, which may, in particular, be embodied as a hub and is arranged to rotate relative to component 115 about axis of rotation 110. The actual rotatability of components 115, 140 relative to each other is usually dependent on whether or not a nonpositive connection is established between component 115 and friction disc support 120.

Actuating device 105 comprises radial support element 145, which may, in particular, be a flange extending in a radial direction from component 140, piston 150, and piston 155. In the illustrated embodiment, piston 155 is designed to be integrated with component 140, i.e., to be formed by the latter. In any case, piston 155 is supported on component 140 and piston 150 is supported on component 115. In the illustrated embodiment, as piston 150 is supported on component 115, friction facings 125, 135 and pressure plate 130 are under compression.

In the illustrated sectional view, support element 145 is essentially bent into an S-shape in the radial direction to form hydraulic pressure chamber 160 and hydraulic pressure chamber 165. Pressure chamber 160 is located radially outside pressure chamber 165. In an alternative embodiment, two pressure chambers 160, 165 may be provided in reverse radial arrangement.

Hydraulic pressure chamber 160 is sealed by piston 150 and hydraulic pressure chamber 165 is sealed by piston 155. Each piston 150, 155 is radially displaceable relative to the respective associated pressure chamber 160, 165.

In the illustrated embodiment, both piston 150 and piston 155 are embodied as a shoulder piston so that in addition to limiting pressure chamber 160 to the right in an axial direction, piston 150 also acts to limit the pressure chamber radially to the outside. In a corresponding way, in addition to limiting pressure chamber 165 to the left in an axial direction via the axial deformability of support element 145, piston 155 also acts to limit pressure chamber 165 radially to the inside.

Pressure chambers 160, 165 are hydraulically connected to each other by aperture 170 formed in support element 145. Furthermore, pressure chamber 165 is connected to fluid line 175, which is embodied as a radial bore formed in component 140. Through fluid line 175, a hydraulic fluid may enter pressure chamber 165 and pass into pressure chamber 160 through aperture 170. Due to the exchange of fluid, there will always be an identical pressure in pressure chambers 160, 165.

Respective seals 180 are preferably provided between support element 145 and piston 150 and between piston 155 and component 140. These seals are provided to seal pressure chambers 160 and 165 in a fluid-tight way while allowing pistons 150, 155 to move in an axial direction relative to pressure chambers 160, 165, respectively. The axial deformability of support element 145 provides the axial movement of piston 155.

Optionally, bearing 185 may be arranged between component 140 and support element 145. Bearing 185 is an axial bearing, usually embodied as a rolling bearing. Since the axial load on bearing 185 may be kept relatively small, bearing 185 may also be embodied as a journal bearing, in particular as a contact plate. In yet another embodiment, bearing 185 may even be dispensed with. In the illustrated embodiment, bearing 185 is located inside hydraulic pressure chamber 165. In alternative embodiments, bearing 185 may be arranged in any other desired location to ensure low-friction axial transmission of power between support element 145 and component 140.

The following is a brief description of the functioning of actuating device 105. To establish or disrupt a transmission of power between component 115 and pressure plate support 120, piston 150 is to be moved axially to the right. For this purpose, ignoring the functioning of hydraulic pressure chamber 165, a hydraulic fluid flows into hydraulic pressure chamber 160 through fluid line 175 and aperture 170. If pressure inside pressure chamber 160 is higher than outside pressure chamber 160, piston 150 is pushed to the right against friction facing 125 and a transmission of power is established between friction elements 125, 135 and pressure plate 130. The force acting on piston 150 towards the right needs to be supported by a force of equal magnitude acting on support element 145 towards the left. This force acting towards the left is transmitted to component 140 via bearing 185.

A portion of this force acting on support element 145 towards the left is compensated by the function of pressure chamber 165. Due to aperture 170, pressure in pressure chamber 165 is always the same as in pressure chamber 160. The pressure present in pressure chamber 165 results in a force that urges support element 145 to the right and piston 155 and component 140 to the left.

In the process, the force acting on support element 145 in pressure chamber 165 towards the right compensates a portion of the force acting on support element 145 in pressure chamber 160 towards the left. A portion of the opposing forces may be absorbed by a bending of support element 145. The resultant force acting on support element 145 towards the left will substantially be reduced by a superposition of the individual forces and by their at least partial compensation.

As a result, the axial forces that act on bearing 185 decrease so that less load is applied to bearing 185. The extent of the decrease of the axial load on bearing 185 is defined by a ratio between hydraulically effective surface 190 of piston 150 and hydraulically effective surface 195 of piston 155. If effective surface 195 of piston 155 is of the same size as surface 190 of piston 150, the forces may neutralize each other completely, allowing bearing 185 to be dispensed with or to be replaced by a contact plate. If effective surface 195 of piston 155 is smaller than effective surface 190 of piston 150, a residual force remains and needs to be transmitted between support element 145 and component 140 while friction disc clutch 100 is actuated and hydraulic pressure chambers 160, 165 are under pressure to close or open friction disc clutch 100.

In accordance with a further embodiment, radially innermost seal 180 provided between support element 145 and component 140 may be dispensed with and support element 145 may be rigidly connected to component 140 in a fluid-tight way at this point. For example, support element 145 may be connected to component 140 by riveting or welding. In this case, movability of piston 155 relative to support element 145 is ensured by the fact that support element 145 is deformable, in particular, elastically bendable in the axial direction. For this embodiment, hydraulically effective surfaces 190, 195 of pistons 150, 155 preferably are of similar or equal size so that the axially opposing forces that act on support element 145 approximately cancel each other so that support element 145 only needs a relatively low degree of deformability.

REFERENCE NUMERALS

100 friction disc clutch
105 actuating device
110 axis of rotation
115 first component
120 pressure plate support
125 first friction facing
130 pressure plate
135 second friction facing
140 second component
145 support element
150 first piston
155 second piston
160 first hydraulic pressure chamber
165 second hydraulic pressure chamber
170 aperture
175 fluid line
180 seal
185 bearing
190 hydraulically effective surface of the first piston
195 hydraulically effective surface of the second piston

What is claimed is:

1. An actuating device for a friction disc clutch, comprising:
   a radial support element;
   a first axially displaceable piston forming a first hydraulic pressure chamber with the radial support element;
   a second non axially displaceable piston forming a second hydraulic pressure chamber with the radial support element, where said first and second hydraulic pressure chambers surround an axis of rotation and said first pressure chamber is in fluid connection with said second pressure chamber;
   a first component supporting the first piston and rotatable about the axis of rotation; and
   a second component supporting the second piston and rotatable about the axis of rotation.

2. The actuating device recited in claim 1, wherein said pressure chambers are arranged to be radially offset relative to each other.

3. The actuating device recited in claim 2, wherein said second pressure chamber is arranged radially to the inside relative to the first pressure chamber.

4. The actuating device recited in claim 1, wherein a hydraulically effective surface of the second piston is smaller than a hydraulically effective surface of the first piston.

5. The actuating device recited in claim 1, wherein a bearing for axially supporting said support element on the second component is provided.

6. The actuating device recited in claim 5, wherein said bearing is received in said second pressure chamber.

7. The actuating device recited in claim 5, wherein said bearing comprises a rolling bearing.

8. The actuating device recited in claim 5, wherein said bearing comprises a journal bearing.

9. The actuating device recited in claim 1, wherein said second piston is designed to be integrated with said second component.

10. An actuating device for a friction disc clutch, comprising:
    a radial support element;
    a first axially displaceable piston forming a first hydraulic pressure chamber with the radial support element;
    a second non axially displaceable piston forming a second hydraulic pressure chamber with the radial support element, where said first and second hydraulic pressure chambers surround an axis of rotation and said first pressure chamber is in fluid connection with said second pressure chamber;
    a first component supporting the first piston and rotatable about the axis of rotation;
    a second component supporting the second piston and rotatable about the axis of rotation; and
    a bearing arranged in the second hydraulic pressure chamber.

11. A friction disc clutch, comprising:
    a first component arranged to rotate about an axis of rotation;
    a second component arranged to rotate about the axis of rotation;
    a pressure plate support arranged to rotate about the axis of rotation;
    a pressure plate fixed to the pressure plate support a radial distance from the axis of rotation;
    friction facings arranged axially adjacent to the pressure plate, where the pressure plate and friction facings are axially displaceable relative to the first component; and,
    an actuating device operatively arranged to urge the friction facings in a first axial direction toward the first component to transmit power between the first component and the pressure plate support where the actuating device includes:
an axially displaceable piston;
a non axially displaceable piston; and
a radial support element.

\* \* \* \* \*